US006975610B1

(12) United States Patent
Van Der Tuijn et al.

(10) Patent No.: US 6,975,610 B1
(45) Date of Patent: Dec. 13, 2005

(54) SYSTEM AND METHOD FOR COMMUNICATING BETWEEN A PLURALITY OF ASYNCHRONOUS SYSTEMS

(75) Inventors: Roel Van Der Tuijn, Mougins (FR); Michel Eftimakis, Opio (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 1143 days.

(21) Appl. No.: 09/597,386

(22) Filed: Jun. 19, 2000

(51) Int. Cl.$^7$ .................. H04B 7/216; H04B 15/00; H04L 7/00
(52) U.S. Cl. .................. 370/335; 370/342; 370/503; 375/356; 455/502
(58) Field of Search .................. 370/335–342, 370/503–506, 336, 337, 347, 516; 375/354, 375/356, 371, 133, 138; 455/422, 502, 507

(56) References Cited

U.S. PATENT DOCUMENTS

| | | | |
|---|---|---|---|
| 4,028,497 A | 6/1977 | Saburi | 179/15 BS |
| 4,504,946 A | 3/1985 | Raychaudhuri | 370/95 |
| 4,656,619 A | 4/1987 | Hotta et al. | 370/13 |
| 4,748,621 A | 5/1988 | Ballance et al. | 370/95 |
| 5,060,180 A | 10/1991 | Kingston et al. | 364/724.03 |
| 5,530,846 A | 6/1996 | Strong | 395/550 |
| 5,631,927 A | 5/1997 | Caia et al. | 375/349 |
| 5,666,366 A * | 9/1997 | Malek et al. | 370/505 |
| 5,737,372 A | 4/1998 | Barham et al. | 375/367 |
| 5,781,597 A | 7/1998 | Owen, III et al. | 375/372 |
| 5,809,092 A | 9/1998 | Gontsch | 375/358 |
| 5,872,820 A * | 2/1999 | Upadrasta | 375/356 |
| 6,275,519 B1 * | 8/2001 | Hendrickson | 375/138 |
| 6,542,754 B1 * | 4/2003 | Sayers et al. | 455/502 |
| 6,574,266 B1 * | 6/2003 | Haartsen | 375/133 |

FOREIGN PATENT DOCUMENTS

| | | |
|---|---|---|
| EP | 1009116 A2 | 11/1999 |
| WO | 98/57450 | 12/1998 |

* cited by examiner

*Primary Examiner*—Frank Duong
*Assistant Examiner*—Melanie Jagannathan
(74) *Attorney, Agent, or Firm*—Aaron Waxler

(57) ABSTRACT

A method and apparatus for communicating between a plurality of asynchronous transmitting and receiving systems using digital streams arranged in multiple access frames comprises a master system, which cycles a counter using a clock reference to generate a master count, and uses the master count to establish a master frame count. A slave system cycles a counter using a clock reference to generate a main count, and uses the main count to establish a main frame count. From a difference between the master frame count and the main frame count of the slave system, a frame count offset value is determined. A slave frame count for the slave system is then established by adding the offset value to the main frame count, and thereby aligning the slave frame count of the slave system with the master frame count and incrementing the slave frame count when the main count is incremented.

18 Claims, 5 Drawing Sheets

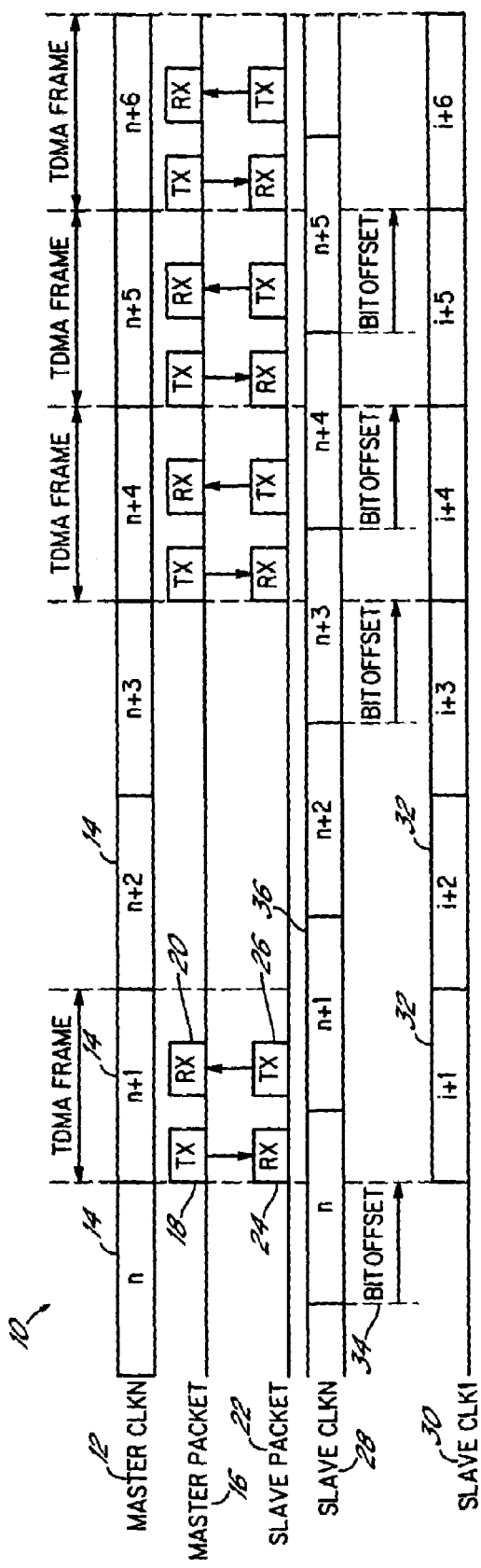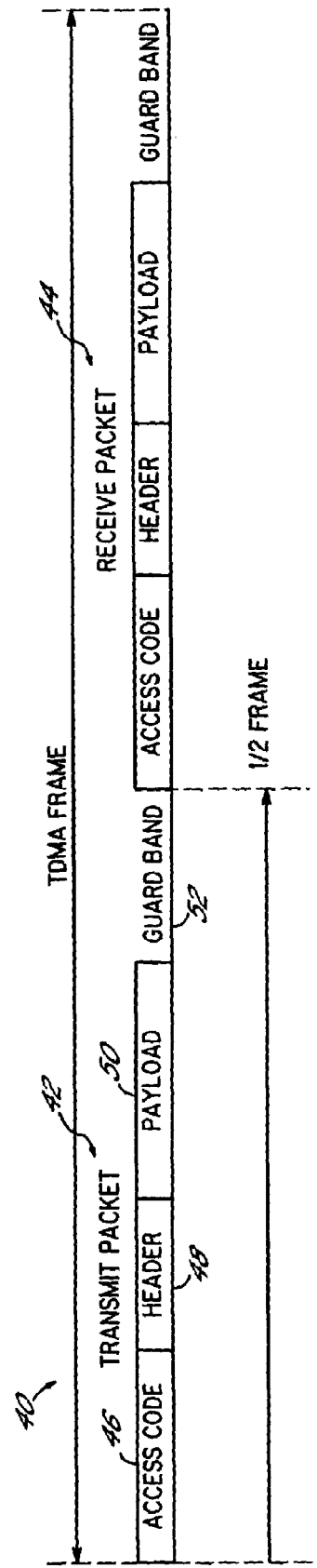
FIG. 1
FIG. 2

US 6,975,610 B1

SYSTEM AND METHOD FOR COMMUNICATING BETWEEN A PLURALITY OF ASYNCHRONOUS SYSTEMS

FIELD OF INVENTION

This invention is directed to a system and method for communication between a plurality of asynchronous transmitting and receiving systems, and particularly between systems utilizing digital streams arranged in multiple access frames.

BACKGROUND OF INVENTION

Various communication schemes are available which allow a plurality of individual asynchronous systems to communicate with each other. Some such schemes allow for multiple access to a communication line or channel so that a certain number of remote systems may access a base system at one time, or may access each other through a base system at any given time without interfering with each other. In such multiple access systems, generally a communication channel or line is shared by the various remote systems. In order to avoid interference on the channel when several systems are using it, the channel is usually divided such that each specific remote system in the overall communication network will only be using the channel under specific parameters which are different from the parameters associated with another system on the channel. That is, only one remote system will be on the channel at any given time.

Various different ways of dividing a channel have been derived and are known in the art. For example, the channel might be divided by frequencies such that each of the respective remote systems in the communication scheme is allocated a different frequency. Such a system is often referred to as a frequency division multiple access (FDMA) communication scheme. Alternatively, in a time division multiple access (TDMA) communication scheme, a number of systems can communicate on the same frequency channel or a plurality of channels, but at different times.

That is, each system has some time divided portion of the channel. Each system knows the particular time during which it may transmit and receive information, and each system therefore acts accordingly to operate within a particular time slot. The use of a TDMA scheme makes very efficient use of the communication channels because multiple systems may use the same frequency channel at the same time without interfering with one another.

More specifically, within a TDMA system, the access time on the channel is divided into a plurality of continuously repeated TDMA frames. Each frame is divided into a variety of slots, with certain slots being allocated for a particular remote system to utilize in transmitting and receiving data. Generally, within each frame, a system which is communicating will have a slot designated in which it will transmit information and another slot designated in which it will receive information. The signals transmitted and received by the respective systems take the form of intermittent signals called "bursts." The bursts, often referred to as packets, are repeated in regular periods corresponding to those respective slots of the TDMA time frame and it is required that such burst signals be properly synchronized in the slots of the frame so as not to overlap each other and cause interference between the systems. Therefore, each station transmits or receives its bursts of communication only within the time slots of the frame that are allotted thereto, so the communication between the respective systems can be performed on the time division basis without any time overlap of the signals transmitted from the various communication systems.

In order to maintain such a time-division communication, it is essential for each system to reliably control its bursts of communication to be correctly transmitted and received within particular time slots of a frame. TDMA communications are usually controlled according to the timing of a master system. That is, the master system defines the length of the frame and the boundaries of the frame and the particular time slots therein which may be utilized by remote systems or slave systems to send or receive their packets. Specifically, when a slave system wants to communicate with or through the master system, it must synchronize its frames and frame boundaries with the frames and frame boundaries of the master system. Where multiple slave systems are accessing a master system, each of the systems must synchronize their frames and frame boundaries with those defined by the master system. In that way, each of the various systems will know the defined frames and will also know the slots of an individual frame in which they may transmit or receive their packets of data. Generally, each system will transmit a packet and also receive a packet within each frame.

For enabling the various systems within the TDMA scheme to stay synchronized, each system maintains a frame counter in order to count the frames that are communicated. Essentially, TDMA frames are generally defined strings of digital bits which are recurring at regular intervals. Therefore, each system counts the bits to define the frame, and when a new frame is detected, the system increments the frame counter. Each system cycles a counter using a clock reference to generate the count which establishes the frame count for the system. When the count reaches a level indicating that a frame has been completed, the frame count is incremented and another frame begins.

Because each of these systems are asynchronous, their frames will generally be defined at different times by their specific counters and clock references. Furthermore, their frame counts will vary. When synchronizing the frames between the master system and any slave system, the boundaries to the frames must be reconciled between the two systems. For example the beginning of a frame boundary of the master system may start multiple bits before the beginning frame boundary of a slave system. In order to align the frames, the frame boundaries must be aligned, and therefore the bit difference between the frame boundaries is determined and a bit offset is used in order to align the frames. The bit offset is determined by using a bit count to reflect the offset between the frames of the master and slave systems. Furthermore, the frame counts between the two systems must be aligned.

One particular TDMA communication scheme which is currently gaining popularity is referred to as a BlueTooth scheme. Within a BlueTooth scheme, it is necessary to be able to maintain communications between at least two different unsynchronized units. Each system within the scheme utilizes its own BlueTooth native clock (CLKN) and one or more slave clocks (CLK1, CLK2). Communication connections between various systems within a BlueTooth scheme require each system to be in either a master mode or slave mode. In the master mode, the communication connection utilizes the time determined by the unit's own native clock (CLKN). For communications in a slave mode, individual clocks such as CLK1 and CLK2 are utilized. In the slave mode, the timing for the CLK1 or CLK2 clock is synchronized to the timing data which is received from a master system and specifically is synchronized to the native clock (CLKN) of that master system. Therefore, within such a BlueTooth scheme, each system will generally have to maintain three individual clocks, CLKN, CLK1, and CLK2. Furthermore, counters, such as frame counters are maintained by each system and are associated with each of the various clock signals, CLKN, CLK1, and CLK2. While the BlueTooth scheme has many desirable qualities, it does have various drawbacks associated with the need for the multiple clocks and counters within each system.

Specifically, power consumption is particularly high for operating various different counters and maintaining separate clocks associated with each counter, and with each master/slave communication connection. Furthermore, hardware associated with each system is more complicated due to the necessity of maintaining various different clocks and counters for each associated master/slave communication connection. That is, for each system within the BlueTooth TDMA scheme, three different long term or frame counters have to be maintained and three different bit counters (for frame boundaries) must also be maintained, representing significant power consumption and hardware complexity.

It is therefore one objective of the present invention to simplify the systems utilized within a TDMA scheme, and particularly within a BlueTooth TDMA scheme.

It is another objective of the invention to reduce the power consumed by each system, and also reduce the hardware complexity associated with each system. Since the BlueTooth TDMA scheme will be particularly applicable to portable electronics, it is further desirable to decrease complexity, size, and power consumption parameters associated with systems in the BlueTooth scheme.

SUMMARY OF THE INVENTION

The system and method of the present invention provide communication between a plurality of asynchronous transmitting and receiving systems utilizing digital streams arranged in multiple access frames.

The complexity of prior art systems is simplified, thereby reducing power consumption and hardware complexity of such systems.

Specifically, a master system is utilized to cycle a counter with a clock reference to generate a master count. Using the master count, a master frame count is established. Within a slave system, a counter is utilized and cycled with a clock reference to generate a main count associated with that slave system. Utilizing the main count of the slave system, a main frame count of the slave system is established.

Utilizing the difference between the master frame count and the main frame count of the slave system, a frame count offset value is determined. A slave frame count is then established for the slave system by adding the offset value to the main frame count of that slave system. In that way, the slave frame count of the slave system is aligned with the master frame count. Thereafter, the slave frame count is incremented when the main count is incremented. Utilizing the slave frame count formed with the offset value, digital streams are communicated between the master and slave systems by aligning frames with the clock reference of the master system when the slave frame count for the slave system is aligned with the master frame count utilizing the offset.

In accordance with one aspect of the present invention, the frames are aligned with the clock reference of the master system by determining a bit offset between a master system frame boundary and a slave system frame boundary, and adjusting the slave system frame boundary with the bit offset so that the frames are aligned. A plurality of bits defining either the master frame boundary or the slave frame boundary may be a portion of the respective master count or slave count. Drift between the clock reference of the master system and the clock reference slave system may then be monitored and the bit offsets may be adjusted so that the slave system frame boundary reflects the drift between the clock references.

When communicating packets of information between the systems, a packet count may be utilized for each frame. The packet count is incremented at a predetermined rate as the frames are communicated. The packet count is started using the bit count determined for the frame boundary of the slave system.

Multiple slave frame counts may be established for a slave system utilizing frame count offset values in accordance with the principles of the present invention. A specific frame count offset value is then maintained by the slave system which corresponds with its communications with another system.

BRIEF DESCRIPTION OF THE DRAWINGS

The accompanying drawings, which are incorporated in and constitute a part of this specification, illustrate embodiments of the invention and, together with a general description of the invention given below, serve to explain the principles of the invention.

FIG. 1 discloses a timing diagram between a master/slave TDMA connection.

FIG. 2 is a timing diagram illustrating TDMA frame and packet timing.

DETAILED DESCRIPTION

Figure 3:
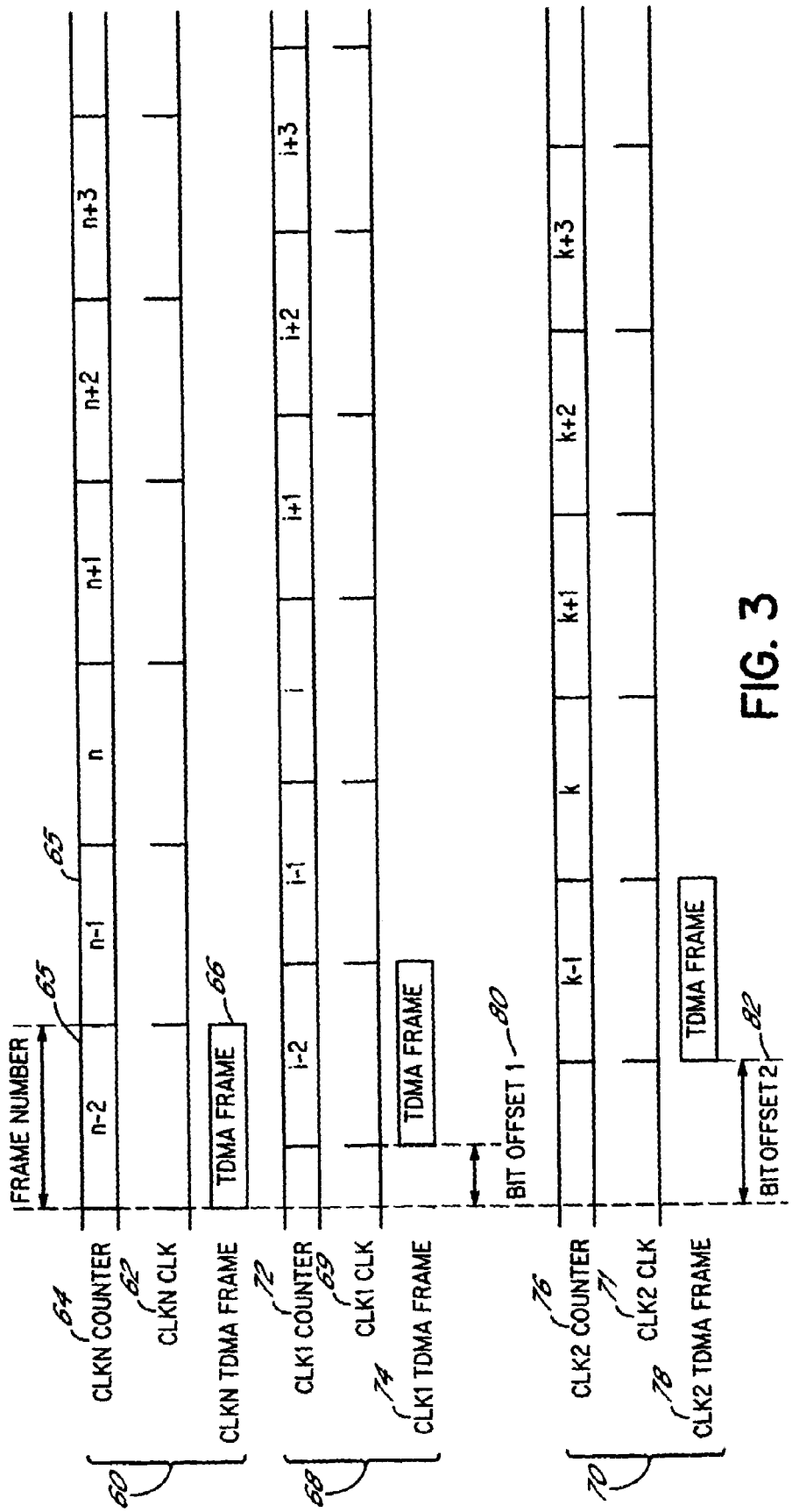
FIG. 3 is a timing diagram illustrating TDMA frame timing.

In illustrating the present invention, it is helpful to understand a prior art BlueTooth scheme utilizing TDMA frames.

Referring to FIG. 1, each system or unit within a BlueTooth scheme has its own native clock (CLKN) and also includes one or more slave clocks (CLK1, CLK2). The native clock, CLKN, is utilized when the system is operating as a master system for communications with one or more slave systems. In that case, the master CLKN clock is utilized to provide synchronization of the TDMA frames, and each of the slaves follows the frame reference provided by the master CLKN clock. The slave systems align themselves by creating and maintaining one or more clocks, CLK1, CLK2 which are considered slave clocks. The slave system still maintains its own slave CLKN clock, but the communications with the master system are based upon the synchronization provided by the CLK1 or CLK2 slave clocks. For the purposes of synchronization, each of the master and slave systems in the communication scheme maintain frame counters for aligning their TDMA frame references for communication purposes. Furthermore, the slave system maintains a bit offset which is reflective of the differences between the master system main clock CLKN and the slave system main clock CLKN.

Specifically referring to FIG. 1, an example of a TDMA communication scheme 10, utilizing BlueTooth parameters, is illustrated. The frame counter of the master system 12 is indicated as MASTER CLKN, and indicates frame counts of n, n+1, and so forth. A particular communication channel is divided into multiple frames 14, which are considered TDMA frames. The terminology CLKN, CLK1, and CLK2, is used interchangeably herein when referring to both the specific clocks and also the frame counts associated with such clocks. This is the result of the frame counters or long-term counters being cycled accordingly to their respective clocks or clock references, CLKN, CLK1, and CLK2.

As shown in FIG. 1, the CLKN clock of the master unit defines the synchronization of the system and defines the various TDMA frames 14.

Each frame is divided into individual slots in accordance with known TDMA communication schemes and the master system and the slave system generally have packets associated with each frame which fit into corresponding frame slots. The master packets 16 are aligned with the frame. Each frame will generally include a transmit packet 18 and a receive packet 20 associated with a particular frame. Referring to the slave packet 22, the nomenclature is reversed. That is, the transmit packet 18 from the master will generally be considered a receive packet 24 for the slave. Similarly, a receive packet 20 for the master is generally a transmit packet 26 from the slave. For each frame, the master and slave systems communicate accordingly. That is, the master system communicates with the slave and the slave answers, or vice versa, as illustrated by the multiple packets 16, 22 illustrated in FIG. 1. Only packets for one master slave connection are shown in FIG. 1. However, it will be readily understood that multiple systems may be communicating with the master, and other packets may also be included within the frame. Within each TDMA frame, the bit timing is fixed so that each packet, whether transmit or receive, starts at a fixed location within the frame. As illustrated in FIG. 1, the transmit and receive packets will generally start at different locations within the frame in order to prevent interference. Furthermore, any other systems communicating with the master system will also have associated slots within the frame for sending their bursts or packets.

Referring to the bottom half of FIG. 1, the slave clock defining a slave frame counter SLAVE CLKN 28 is illustrated. As illustrated, the frame counter SLAVE CLKN 28 is not aligned with the master frame counter MASTER CLKN 12. When communication between systems begins, the master system sets the particular timing, frame count, and frame boundaries utilized for communication, and the slave system synchronizes the communication with the master to the master timing. To that end, the slave system starts and maintains a slave clock CLK1 and associated slave frame count indicated in FIG. 1 as SLAVE CLK1 30. The clock CLK1 and associated counter SLAVE CLK1 is aligned with the master main clock CLKN and its associated frame counter 12. As illustrated in FIG. 1, the master (n+1) frame aligns with the slave (i+1) frame; the master (n+2) frame aligns with the slave (i+2) frame, and so on. Therefore, the slave clock CLK1 and associated frame counter 30 are separately maintained by the slave system when it is synchronized with the timing of the master main clock CLKN and its respective frame counter 12. In that way, the frames between the master system and the slave system are in alignment for proper communication under a TDMA scheme and particularly under a BlueTooth scheme.

In order for the CLK1 clock of the slave system and its corresponding frames 32 and counter 30 to be aligned with the timing of the master system, a bit offset is used by the slave system. The bit offset indicated by reference numeral 34 for the slave system is an offset utilized to define the frame boundaries of the slave frames 32 to maintain synchronization with the master system frames 14. The bit offset 34 is maintained with respect to the slave's own master clock and associated frame count SLAVE CLKN 28 as illustrated in FIG. 1. That is, the CLK1 clock and associated frames of the slave unit are bit offset with respect to the slave system clock CLKN and its frames 36.

FIG. 2 illustrates a typical TDMA frame 40 which, for a particular communication between a master system and a slave system, includes a transmit packet 42 and a receive packet 44. Generally, one or the other of the transmit packet and receive packet is in the first half of the frame, and the other corresponding transmit or receive packet will be in the second half of the frame. When a system, either slave or master, is in communication with one or more other systems, each frame will generally have transmit and receive packets associated with the communication. That is, the frames will include multiple transmit and receive packets within the various slots associated with the TDMA frame for the multiple systems communicating in the frame. Each packet will include a series of bits indicated as an access code 46, another series of bits indicated as a header 48, and finally the contents of the packet or payload 50. A guard band 52 is usually utilized between the various packets to prevent overlap and interference. The access code 46 and header 48 include information about the packet and also about the communication frame and other communication parameters necessary for synchronization between the various communicating systems. Specifically, the bit offset is extracted from the reception of the access code. To align frames between two systems, frame boundary information and the frame count value needs to be communicated between the master and slave systems. The frame boundary information is derived from the reception of the access code, whereas the frame count value is communicated using a message in the packet payload. Therefore, when a slave system receives the access code and other packet information from the master system in a particular packet, the slave system knows the master system frame timing and can synchronize its frame timing accordingly, utilizing an available slave clock, such as CLK1 or CLK2. The frame boundary or frame timing of frame 40 begins with the first bit or the zero location bit of the access code 46. The header 48 contains additional information, such as parameters for data flow control, sequencing, acknowledgment and slave addressing, and the payload 50, which makes up generally the greatest portion of the packet, maintains the information which a particular slave or master system wants to communicate to another system. The receive packet 44 is similarly situated and arranged as the transmit packet 42, with different information corresponding to that packet and a different slot or location in the frame.

FIG. 3 illustrates various clocks, frame counters, and TDMA frame references for the various clocks maintained within a system, whether master or slave. Group 60 refers to the system main clock 62 indicated as CLKN, and its associated counter 64. The clock 62 defines the timing when the system is acting as a master system and also defines frames 65. The timing defined by the clock CLKN 62 and its associated counter 64 defines a TDMA frame reference 66 which is in alignment with the clock and the frame counter 64. The main clock CLKN and associated frame counter and TDMA frame reference are therefore utilized by remote slave systems when the system 60 acts as a master system when communicating with remote systems. That is, the other system, considered a slave system, would adjust its timing to address the timing defined by the master main clock CLKN.

Reference numerals 68 and 70 indicate other clocks and frame references generally maintained within a system under the current BlueTooth parameters. The clocks, CLK1, CLK2 are used when the system is acting as a slave system. Such additional clocks, counters, and the TDMA frame references associated therewith, require significant power consumption within a device. Furthermore, the hardware associated with maintaining the additional slave clocks, CLK1 69, and CLK2 71, is complicated. The increased power consumption and circuit complexity therefore increases the cost of such a system. The present invention addresses such systems by only requiring one clock, that is, the main clock CLKN of the system.

The clock CLK1 defines an associated frame counter 72 and TDMA frame reference 74. Similarly, clock CLK2 also maintains an associated frame counter 76 and frame reference 78. As discussed above with respect to FIG. 1, clock CLK1 and CLK2 are maintained based upon a bit offset with respect to the main clock CLKN of the system. Specifically, bit offset 1, referred to by the reference numeral 80, is an offset for the CLK1 clock and associated frame references and frame counters. Bit offset 1 is referenced with respect to the main clock CLKN of the system as shown in FIG. 3. Similarly, the bit offset 2, referenced by reference numeral 82, is maintained with respect to clock CLK2 and its associated frame counter and frame reference. The reference for CLK2 to which bit offset 2 is applied is also the main CLKN of the system.

Figure 4:
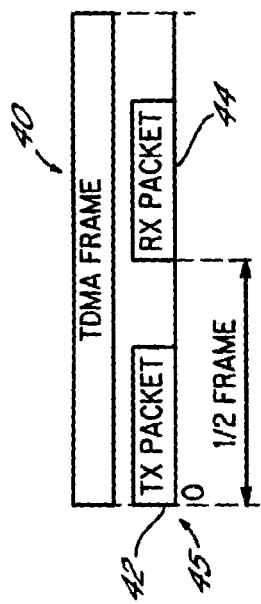
FIG. 4 is a timing diagram illustrating packet timing within a TDMA frame.

FIG. 4 is another illustration of a TDMA frame and its construction.

When a communication is initiated between two systems, the slave system utilizes its master clock CLKN to scan for packets from another master system. Once a packet is received from a master system, the offset to the slave CLKN timing is recorded. That is, a determination is made with respect to the main clock reference CLKN of the master system and the main clock reference CLKN of the slave system. Utilizing the offset, a dedicated slave clock, CLK1 or CLK2 (see FIG. 3) is started utilizing the offset. As noted above with respect to FIG. 2, the slave receives the bit offset within the transmit packet 42 and specifically receives the bit offset by receiving the access code of the transmit packet. The position of the received access code translates into the bit offset to be used. Generally, the frame timing information will be within the first bit, or zero position bit 45, of transmit packet 42 in the first half of TDMA frame 40.

As noted above, each of the systems maintains an associated frame counter for its communication connections. For example, in a system utilizing three different clocks, CLKN, CLK1 and CLK2, associated counters CLKN COUNTER 64, CLK1 COUNTER 72, and CLK2 COUNTER 76 are also maintained (see FIG. 3). The frame counter is a parameter utilized within the TDMA communication scheme generally. Specifically, a frame counter is maintained within a TDMA system utilizing the BlueTooth parameters. The frame counters are utilized to count the various frames which are generated, so that the master and slave systems will be processing the proper frames at the proper times. That is, the frame counter allows each system to know which frame is being analyzed so that the operations associated with that frame are completed rather than the operations associated with another frame either preceding or following the current frame of the system. In the BlueTooth system, the frame number is also used to generate the communication frequency utilized between the communicating systems.

Generally, every packet uses a different frequency according to a BlueTooth hop selection box. Still further, frame counters are utilized for encrypting data within a particular packet. More information regarding the BlueTooth system is publically available in various locations, such as at the Internet web site www.bluetooth.com.

When communications are initiated between two systems, the exact frame number is contained in the packet sent by the master system. When the packet is received by the slave system, it is loaded into the frame counter for the CLK1 or CLK2 counter which is being initiated. As the systems progress through frames, the various frame counters in each of these systems is incremented according to a specific corresponding clock reference and cycle, such as that provided by CLKN, CLK1, and CLK2. Bit offsets 80, 82 are transmitted as part of the access code 46 of a packet and are used to offset a bit counter which defines a frame boundary. A bit counter is maintained in each system to define the boundaries of the frame and the location of particular information within a frame. A bit counter may be a separate counter maintained by the system or might be part of the frame counter, such as the least significant bits (LSBs) of the frame counter. At bit zero within a frame, the first bit of the access code is transmitted and at bit x, the header field 48 of the packet begins. Similarly, at bit y, the access code for the receive packet 44 is expected to be received by the system. (See FIG. 2.)

Due to the master system and the slave system having their own reference clocks CLKN, their timing will tend to drift as the clocks drift.

Figure 5:
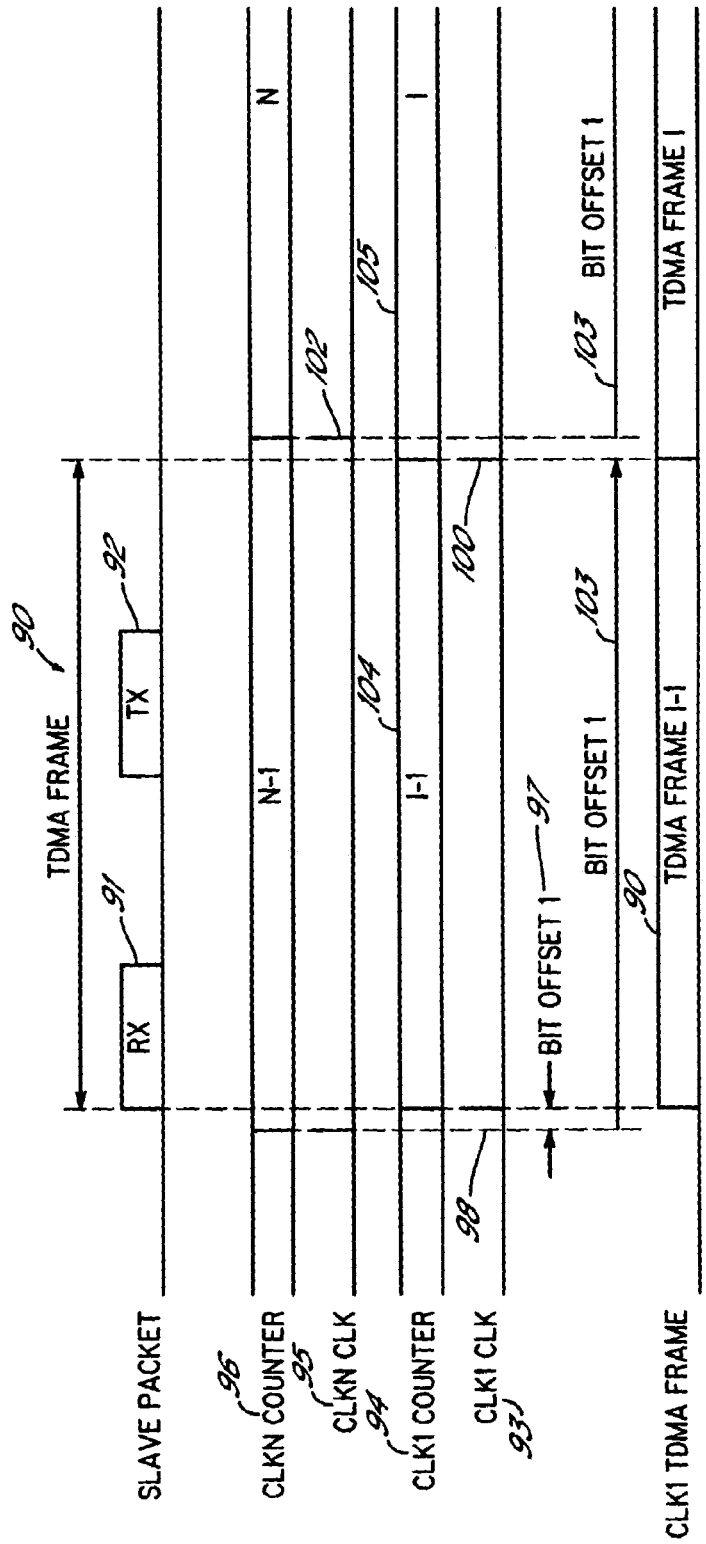
FIG. 5 is a timing diagram illustrating drift of a TDMA frame associated with clock drift.

Referring to FIG. 5, a frame 90 of the slave system is shown with numerous packets 91, 92 therein. The slave frame 90 is synchronized with the slave clock CLK1 93 and its associated counter CLK1 COUNTER 94, as illustrated in FIG. 5. The slave clock CLK1 and associated counter are offset from the slave's main clock CLKN and its associated counter 96, as illustrated by the bit offset 97 and discussed above. The drift associated with the various main clocks CLKN will change the bit offset 97 between a master and slave system. Accordingly, the clock CLK1 or CLK2 is continuously updated to follow the drift. For example, referring to FIG. 5, the bit offset 97 is defined by the frame boundary of the CLKN frame of the slave unit indicated by reference numeral 98. The bit difference between frame boundary 98, for the CLKN frame, and the TDMA frame of CLK1, indicated with reference numeral 99, is the bit offset 97. However, if the CLK1 clock drifts to the left due to a drift of the master main clock CLKN, then boundary 99 will drift to the left of boundary 98. Referring to the right side of FIG. 5, the CLK1 frame boundary 100 will then be to the left of the slave CLKN frame boundary 102. In that regard, the bit offset 97, which was very small, now becomes very large and is indicated by bit offset 103. Therein, with respect to frame (i−1) 104 the bit counter was small, but with respect to frame (i) 105 the bit offset 103 becomes significantly larger. Due to such drift, the bit offset is constantly updated, and within a particular TDMA frame, the new value for the bit offset to address the drift is received in the new receive packet 91 of the frame.

As noted above, the prior art systems require that multiple clocks be maintained within each system, depending upon whether the system is acting as a master system or a slave system, or both, in communication with other systems. The necessity for maintaining additional clocks and associated frame counters and bit offsets increases the power consumption of the systems and increases their overall complexity. As a result, the systems are more expensive. The present invention addresses such drawbacks by eliminating additional clocks and maintaining only one main clock, CLKN, for each system. Frame counts associated with the various communication connections in a system are maintained utilizing the main CLKN clock and its associated CLKN frame counter, even when the system is acting as a slave system. Instead of establishing and maintaining separate clocks and frame counters, a frame offset is determined and maintained to be utilized with the main frame counter CLKN COUNTER in order to determine and maintain a value indicative of the frame counters normally associated with the CLK1 and CLK2 frame clocks. The frame offset or frame counter offset of the invention is used to align the frame counting in the slave system with the frame counting in the master system which sets the synchronization protocol.

To that end, a packet is communicated from the master system to the slave system (see FIG. 4). The packet contains the current frame number or frame count of the master system. Utilizing the master system frame count, the slave system is operable for determining an offset to its own main frame counter and will update its frame counter offset. Therefore, the slave system main clock, CLKN and its associated counter, are utilized with frame count offset values to create the counters which are representative of counters for CLK1 and CLK2. Individual CLK1 and CLK2 clocks and associated counters from those clocks are not maintained. Rather, only the main CLKN clock counter is maintained and frame count offset values are utilized to generate the other frame counters. Herein, although individual CLK1 and CLK2 clocks and counters based on those clocks are not maintained, the nomenclature will be maintained when indicating the various counters which are formed with offsets according to the principles of the present invention. That is, the counts maintained using the offsets of the invention will still be referred to as CLK1 and CLK2 counts, even though separate CLK1 and CLK2 clocks are not used.

Figure 6:
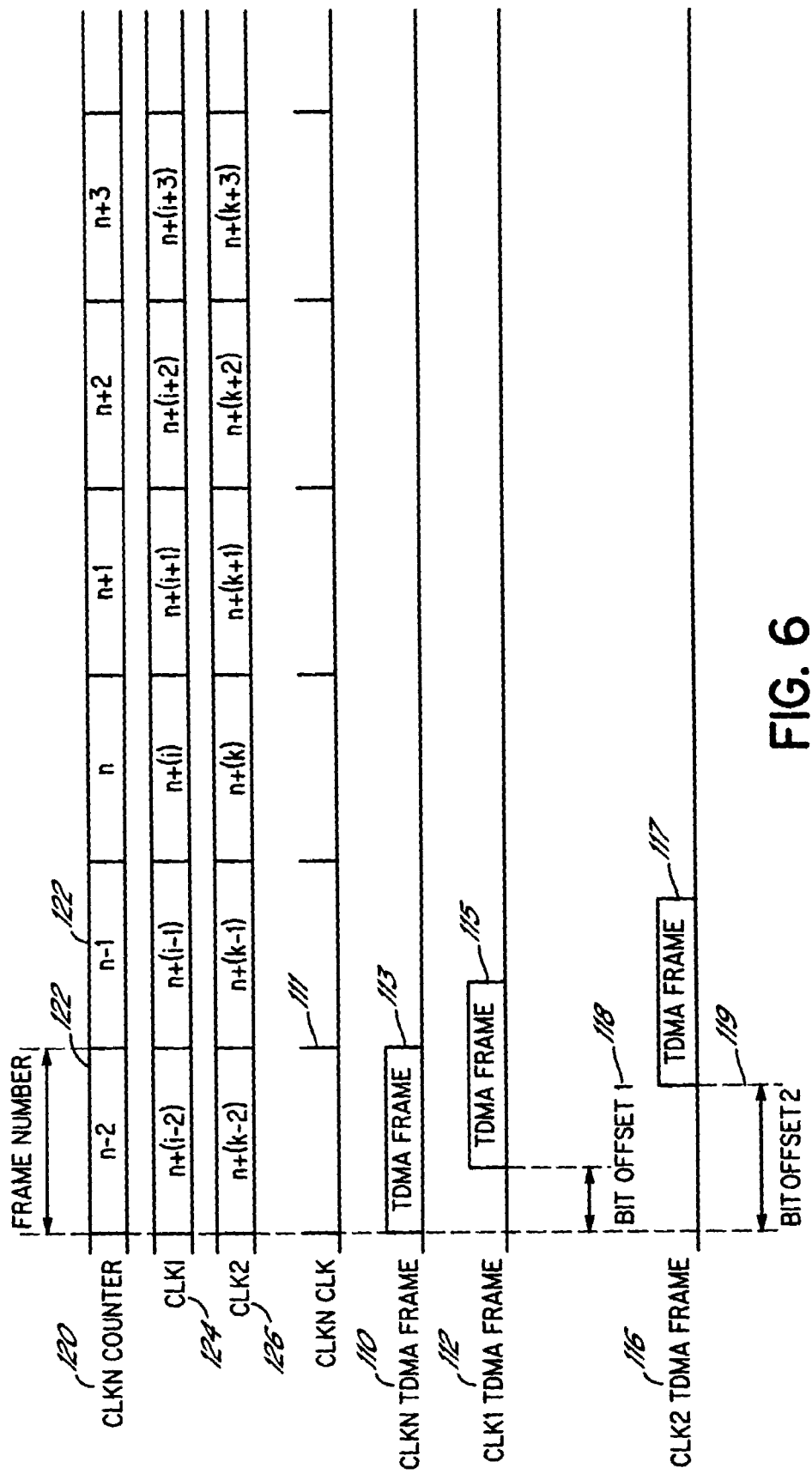
FIG. 6 is a timing diagram in accordance with the principles of the present invention illustrating TDMA frame timing.

Referring to FIG. 6, the various counters within a system are shown. In accordance with one aspect of the present invention, the frame counters for each communication stream will be based upon a single counter, regardless of whether the system acts as a master system or a slave system.

When the system acts as a master system, the frame count will be based upon the main CLKN clock and counter. When the system acts as a slave system, the frame count will still be based upon the main CLKN clock and associated counter as well; however, the counters will be offset according to specific frame offsets of the invention. The various frame offsets, or frame count offsets are simply added to the frame count maintained in association with the main clock CLKN, according to the following equations;

$$CLK1 = CLKN + Clk1\text{FrameOffset}$$

$$CLK2 = CLKN + Clk2\text{FrameOffset}$$

As will be readily understood by a person of ordinary skill in the art, the present invention may be utilized with a system which maintains any number of clocks or communication links with other systems. In a BlueTooth scheme, slave interconnections are indicated by CLK1 and CLK2; however additional communication links may be maintained and may have frame counts associated therewith. Therefore, the present invention is not limited to any number of particular communications between a system and other remote systems.

Referring to FIG. 6, timing is shown for a system which may maintain one master communications line and two slave communications lines. Specifically, the main clock, CLKN 110 sets the main timing for the system, as indicated by the various hash marks 111. Accordingly, when the system acts as a master system, the frame reference 112 for the TDMA scheme defines a frame 113 which is synchronized with the CLKN clock 110.

Alternatively, when the system acts as a slave system, different frame references, 114, 116, are maintained. Those slave frame references will be based upon the timing and frame reference of the master system with which the slave system communicates.

During communications, a master system will cycle a counter, such as its main counter, using a clock reference, such as the main clock reference CLKN, to generate a master count. The master count is used to establish a master frame count. In the slave system communicating with the master system, another counter is also cycled using a clock reference, such as the main clock reference CLKN of the slave system. In the slave system, a slave count is generated, and the slave count is utilized to establish a slave frame count. Based upon a difference between the master frame count and the slave frame count, a frame count offset value is determined. Within the slave system, a reference frame count, utilized for synchronizing with the master system, is established by adding the frame count offset value to the slave frame count. In that way, the master frame is aligned with the reference frame count of the slave system. The reference frame count is incremented when the slave count is incremented. Digital streams of information comprising a series of bits are communicated between the master and slave systems by aligning frames with the clock reference of the master system when the referenced frame count for the slave system is aligned with the master frame count.

In accordance with one aspect of the present invention, the frame count, for each link wherein a system acts as a slave system, will be based upon the main frame counter or 120 of that system. Each system will normally be maintaining main frame count 120 which it uses as the frame count when it acts as a master system. Counter 120 will count various frames 122. The frame counter which the system utilizes when it acts as a slave is also based on the clock CLKN 110 and main counter 120. The slave CLK1 counter 124, and the slave CLK2 counter 126 thus indicate frame count values along with counter 120 even though the counter values will be offset based upon the CLK1 frame offset value (i) and the CLK2 frame offset value (k) (see FIG. 6). That is, the offset values are simply added to the main counter 120 and the main count it produces to produce additional slave frame counts 124 and 126. In that way, separate clocks are not maintained and separate counters for those clocks are not created and started when the system acts as a slave system, as is done in the prior art. Therefore, the frame counts 120, 124, and 126 are shown as essentially synchronized together since they are each based upon the main CLKN counter 120 and main count for the system. That is, the various counters change value at the same moment in time based on the main CLKN clock 120 for the system regardless of whether the system is acting as a master or a slave.

In accordance with another aspect of the present invention, multiple bit counters and bit counts are not maintained for individual clocks. Rather, a single internal bit counter associated with the main clock, CLKN is maintained. The CLKN bit counter is utilized for defining the frame boundary for TDMA frame 113 based upon the main clock. When the system acts as a master using the main counter CLKN and its clock, the CLKN bit counter will define the master frame. To define the slaves frames 115 and 117 associated with the respective slave frame references 114, 116, the present invention maintains a bit offset 118, 119 for the various communication links. The bit offset is added to a main CLKN bit counter maintained by the system based upon the main clock CLKN. Therefore, the bit count is generated with the following formula:

CLK1 bit counter=CLKN bit counter+CLK1 bit offset.

CLK2 bit counter=CLKN bit counter+CLK2 bit offset.

The main bit counter may be maintained as a separate counter, or may be maintained as part of the main CLKN frame counter, such as in the least significant bits (LSBs) of the main frame counter.

Utilizing the bit offset 119 associated with each communication link, slave frame references 114 and 116 are defined. Bit offset 1 118 defines the slave frame 115. Again, the frame reference 114 will be based upon the timing of a remote master system, because the present system acts as a slave system. Similarly, frame reference 116 utilizes bit offset 119 to define slave TDMA frame 117. Frame reference 116 will also be based upon the master timing of another remote master system.

Referring again to FIG. 6, in accordance with one aspect of the present invention, the frame counters 124, 126 are no longer aligned with their respective slave frame references 114, 116 and the TDMA frames 115, 117. While the slave frame counters 124, 126 are based upon the count of the main counter 120, the frame references 114, 116 still must be maintained according to timing dictated by a remote master system. As discussed above, bit offsets are utilized for defining and maintaining the frames within the various slave frame references 114, 116. Frame 113 does not utilize an offset as it is based upon the main CLKN clock, and is relied upon when the system is a master.

In the present invention, the frame structure, including the various packet positions is maintained as illustrated in FIG. 4. However, in the present invention, the processing of the various TDMA frames and the packets therein is not dependent upon fixed TDMA timing dictated by separate clocks. As noted above, individual clocks CLK1 and CLK2 are not maintained. Rather, based upon the derived bit counter which is reflective of the main bit counter of the main CLKN clock and the addition of bit offsets 118, 119, a packet counter is maintained. The packet counter is started with the derived bit counter and is free-running for the rest of the packet. The packet counter therefore determines how the system processes a particular transmit or receive packet within a TDMA frame.

Figure 7:
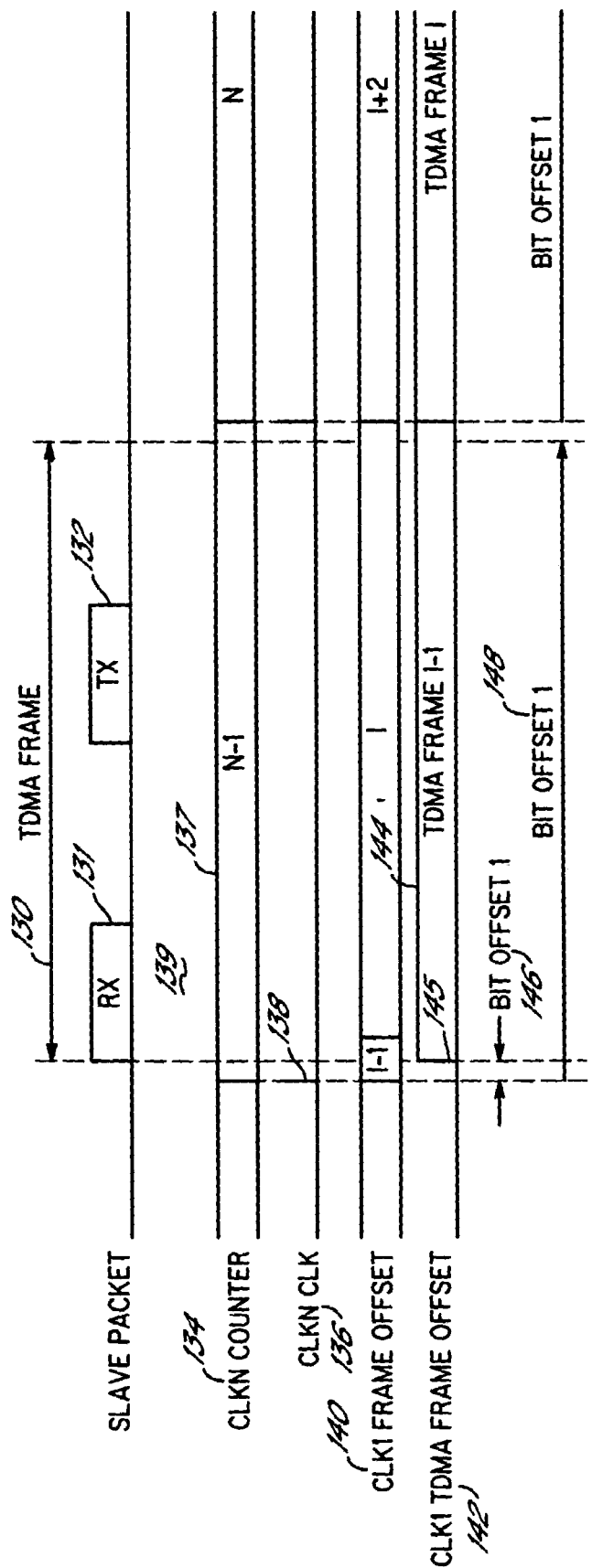
FIG. 7 is a timing diagram in accordance with the principles of the present invention illustrating frame drifting associated with clock drift between the master and slave systems.

As with prior art systems, the main CLKN clocks between the systems (master CLKN and main CLKN of the slave) will drift. Referring to FIG. 7, a TDMA frame 130 for a slave system includes a receive packet 131 and a transmit packet 132. The main frame counter 134 is based on the main clock CLKN 136 and the boundaries of the CLKN frame 137 is defined by the counter cycle 138. That is, the front boundary of frame 137 indicated by reference numeral 139 is in line with the clock 138. The offset frame count of the slave, maintained in accordance with the principles of the present invention, is indicated by reference numeral 140. The actual TDMA frame associated with the slave timing and count is indicated by reference numeral 142. The slave frame count 140 is not aligned with the slave TDMA frame reference 142. As is illustrated in FIG. 7, the slave frame has a boundary 145 offset from the CLKN clock 136 by bit offset 1 146. Referring to the left side of FIG. 7, the actual TDMA frame reference overlaps with the frame count 140, although they are not aligned. That is, the (i−1) frame is counted when the actual (i−1) TDMA frame begins. However, should the TDMA frame 144 drift to the left over the frame boundary 139, the bit offset is now reflected by 148 and thus its value must be changed in accordance with one aspect of the present invention. If the drift is such that the frame boundary is crossed and the CLK1 frame counter 140 indicates a different frame number than the actual TDMA frame 144, the present invention adjusts the offset value. Accordingly, to address drift within the clocks of two communicating systems in accordance with the principles of the present invention, the value of the bit offsets, and the value of the frame offsets are adjusted. While drift is discussed above with respect to one direction, such as to the left, drift in the other direction, such as to the right, might be handled in a similar fashion.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the spirit or scope of applicant's general inventive concept.

What is claimed is:

1. A method for communicating between a plurality of asynchronous transmitting and receiving systems using digital streams arranged in multiple access frames, the method comprising:

(a) in a master system, cycling a counter using a clock reference to generate a master count, and using the master count to establish a master frame count;

(b) in a slave system, cycling a counter using a clock reference to generate a main count and using the main count to establish a main frame count;

(c) from a difference between the master frame count and the main frame count of the slave system, determining a frame count offset value;

(d) establishing a slave frame count for the slave system by adding the offset value to the main frame count, and thereby aligning the slave frame count of the slave system with the master frame count and incrementing the slave frame count when the main count is incremented;

(e) communicating digital streams between the master and slave systems by aligning frames with the clock reference of the master system when the slave frame count for the slave system is aligned with the master frame count wherein the master and slave systems each generate a count with a plurality of bits which define frame boundaries for the respective systems, the step of aligning frames with the clock reference of the master system further comprising determining a bit offset between a master system frame boundary and a slave system frame boundary and adjusting the slave system fire boundary with the bit offset so that the frames are aligned.

2. The method of claim 1 wherein said plurality of bits defining the master frame boundary is a portion of the master count.

3. The method of claim 1 wherein said plurality of bits defining the slave frame boundary is a portion of the slave count.

4. The method of claim 1 wherein said at least one of said master and main counts includes first and second pluralities of bits, the first plurality of bits forming said frame count and the second plurality of bits forming a bit count for defining frame boundaries for the respective systems.

5. The method of claim 1 further comprising monitoring drift between the clock reference of the master system and the clock reference of the slave system and adjusting the bit offset and the slave system frame boundary to reflect the drift between the clock references.

6. The method of claim 1 further comprising monitoring drift between the clock reference of the master system and the clock reference of the stave system and adjusting the slave frame count of the slave system to reflect the drift between the clock references.

7. A method for communicating between a plurality of asynchronous transmitting and receiving systems using digital streams arranged in multiple access frames, the method comprising:
(a) in a master system, cycling a counter using a clock reference to generate a master count, and using the master count to establish a master frame count;
(b) in a slave system, cycling a counter using a clock reference to generate a main count, and using the main count to establish a main frame count;
(c) from a difference between the master frame count and the main frame count of the slave system, determining a frame count offset value;
(d) establishing a slave frame count for the slave system by adding the offset value to the main frame count, and thereby aligning the slave frame count of the slave system with the master frame count and incrementing the slave frame count when the main count is incremented;
(e) communicating digital streams between the master and slave systems by aligning frames with the clock reference of the master system when the slave frame count for the slave system is aligned with the master frame count further comprising generating a bit count for the slave system reflective of the frame boundary of the slave system.

8. The method of claim 7, further comprising:
(a) starting a packet count for each frame of each digital stream using the bit count determined for the frame boundary of the slave system; and
(b) incrementing the packet count at a predetermined rate thereafter for communicating the frame between the systems.

9. A communication system including a plurality of asynchronous transmitting and receiving systems using digital streams arranged in multiple access frames, the system comprising:
a master system operable for cycling counter using a clock reference to generate a master count, the master system using the master count to establish a master frame count;
a slave system operable for cycling a counter using a clock reference to generate a main count, the slave system using the main count to establish a main frame count;
a circuit operable for determining a difference between the master frame count and the main frame count and creating a frame count offset value;
the slave system further operable for establishing a slave frame count by adding the offset value to the main frame count, and thereby aligning the master frame count with the main frame count of the slave system, the slave system incrementing the slave frame count when the main count is incremented;
the master and slave systems operable for communicating digital streams therebetween by aligning frames with the clock reference of the master system when the slave frame count for the slave system is aligned with the master frame count wherein the master and slave systems each generate a count with a plurality of bits which define frame boundaries for the respective systems, the system further comprising a circuit operable for determining a bit offset between a master system frame boundary and a slave system frame boundary and adjusting the slave system frame boundary with the bit offset so that the frames are aligned between the master and slave systems.

10. The system of claim 9 wherein said circuit for determining a difference between the master and slave frame counts is part of the slave system.

11. The system of claim 9 wherein said circuit for determining a bit offset between the master and slave system frame boundaries is part of the slave system.

12. The system of claim 9 wherein said plurality of bits defining the master frame boundary is a portion of the master count.

13. The system of claim 9 wherein said plurality of bits defining the slave frame boundary is a portion of the slave count.

14. The system of claim 9 wherein at least one of said master and main counts includes first and second pluralities of bits, the first plurality of bits forming said frame count and the second plurality of bits forming a bit count for defining frame boundaries for the respective systems.

15. The system of claim 9 further comprising a circuit operable for monitoring drift between the clock reference of the master system and the clock reference of the slave system and adjusting the bit offset and the slave system frame boundary to reflect the drift between the clock references.

16. The system of claim 9 further comprising a circuit operable for monitoring drift between the clock reference of the master system and the clock reference of the slave system and adjusting the slave frame count of the slave system to reflect the drift between the clock references.

17. A communication system including a plurality of asynchronous transmitting and receiving systems using digital streams arranged in multiple access frames, the system comprising:
a master system operable for cycling a counter using a clock reference to generate a master count, the master system using the master count to establish a master frame count;
a slave system operable for cycling a counter using a clock reference to generate a main count, the slave system using the main count to establish a main frame count;

a circuit operable for determining a difference between the master frame count and the main frame count and creating a fame count offset value;

the slave system further operable for establishing a slave frame count by adding the offset value to the main frame count, and thereby aligning the master frame count with the main frame count of the slave system, the slave system incrementing by the slave frame count when the main count is incremented;

the master and slave systems operable for communicating digital streams therebetween by aligning frames with the clock reference of the master system when the slave frame count for the slave system is aligned with the master frame count wherein said slave system is operable for generating a bit count reflective of the frame boundary of the slave system.

18. The system of claim 17 further comprising a circuit operable for starting a packet count for each frame of each digital stream using the bit count determined for the frame boundary of the slave system, the packet count being incremented at a predetermined rate thereafter for communicating the frame between the systems.

* * * * *